(12) United States Patent
Tian et al.

(10) Patent No.: US 8,735,519 B2
(45) Date of Patent: May 27, 2014

(54) POLYOLEFIN PRODUCED WITH A HIGH PERFORMANCE SUPPORT FOR A METALLOCENE CATALYST SYSTEM

(71) Applicant: Fina Technology, Inc., Houston, TX (US)

(72) Inventors: Jun Tian, League City, TX (US);
William Gauthier, Houston, TX (US);
David Rauscher, Angleton, TX (US);
Shady Henry, Seabrook, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 13/859,572

(22) Filed: Apr. 9, 2013

(65) Prior Publication Data

US 2013/0230718 A1 Sep. 5, 2013

Related U.S. Application Data

(60) Continuation of application No. 12/013,774, filed on Jan. 14, 2008, now Pat. No. 8,436,112, which is a division of application No. 11/136,136, filed on May 24, 2005, now abandoned, which is a continuation of application No. 10/178,620, filed on Jun. 24, 2002, now abandoned.

(51) Int. Cl.
*C08F 4/52* (2006.01)
*C08F 4/64* (2006.01)
*C08F 4/76* (2006.01)

(52) U.S. Cl.
USPC ........... 526/160; 526/170; 526/126; 526/127; 526/129; 526/130; 526/151; 526/153; 526/155; 526/156; 526/158; 526/159; 526/941; 526/943; 526/905; 526/348; 526/348.6; 526/351; 526/352

(58) Field of Classification Search
USPC ........... 526/351, 160, 170, 943, 130; 528/396
See application file for complete search history.

(56) References Cited

U.S. PATENT DOCUMENTS

| | | | | |
|---|---|---|---|---|
| 5,895,770 A * | 4/1999 | Pullukat et al. | ............... | 502/103 |
| 6,048,817 A * | 4/2000 | Sagae et al. | .................... | 502/117 |
| 6,211,109 B1 * | 4/2001 | Shamshoum et al. | ........ | 502/152 |
| 6,225,251 B1 * | 5/2001 | Shamshoum et al. | ........ | 502/103 |
| 6,239,058 B1 * | 5/2001 | Shamshoum et al. | ........ | 502/110 |
| 6,420,501 B1 * | 7/2002 | Uwai et al. | ..................... | 526/165 |
| 6,432,860 B1 * | 8/2002 | Shamshoum et al. | ........ | 502/103 |
| 6,777,366 B2 * | 8/2004 | Gauthier et al. | ............. | 502/117 |
| 6,777,367 B2 * | 8/2004 | Gauthier et al. | ............. | 502/117 |
| 7,342,078 B2 * | 3/2008 | Schottek et al. | ............. | 526/160 |
| 8,436,112 B2 * | 5/2013 | Tian et al. | ..................... | 526/160 |

FOREIGN PATENT DOCUMENTS

WO WO 99/20661 A1 * 4/1999 .............. C08F 4/642

* cited by examiner

*Primary Examiner* — Rip A. Lee (57) ABSTRACT

The invention is directed to a metallocene catalyst system and a process for preparing the system. The metallocene catalyst system comprises a support and metallocene bound substantially throughout the support. The selection of certain supports facilitates the production of metallocene catalyst systems having increased catalytic activity than previously recognized.

16 Claims, 5 Drawing Sheets

POLYOLEFIN PRODUCED WITH A HIGH PERFORMANCE SUPPORT FOR A METALLOCENE CATALYST SYSTEM

CROSS-REFERENCE TO RELATED APPLICATIONS

This application is a Continuation of U.S. application Ser. No. 12/013,774, filed on Jan. 14, 2008, now issued as U.S. Pat. No. 8,436,112, which is a Divisional of Ser. No. 11/136,136 filed on May 24, 2005, now abandoned, which is a Continuation of Ser. No. 10/178,620 filed on Jun. 24, 2002, now abandoned.

TECHNICAL FIELD OF THE INVENTION

The present invention is directed, in general, to a metallocene catalyst system for the production of polyolefins and more specifically, to a metallocene catalyst system that includes the selection of silica supports within the catalyst system that provide increased catalytic activity.

BACKGROUND OF THE INVENTION

Metallocenes are of increasing importance as a commercial olefin polymerization catalyst. Typically, a metallocene catalytic system (MCS) is used in the polymerization of olefins. The MCS may comprise a metallocene and an activator on a support, for example, an inorganic support. Such activators are well known and typically include an aluminum alkyl or aluminoxanes, such as methylaluminoxane (MAO). To form a conventional MCS, the metallocene and the optional alumoxane activator may be reacted in the presence of the support to provide a supported metallocene-alumoxane reaction product. For example, a silica gel support may be coated with an alumoxane, such as methylalumoxane (MAO). A metallocene may be complexed with the alumoxane bound to the support to form a MCS that can then be used in an olefin polymerization process. A trialkylaluminum or organoaluminum activator or scavenger may be employed during the polymerization process to increase catalytic activity.

However, for such MCSs to provide an economically viable alternative to conventional catalysts, a number of limitations must be overcome. For example, the MCS must be capable of producing polymers of the desired stereospecificity and morphology. For example, stereoregular polymers produced from such MCSs should have a certain desired tacticity. Isotactic polypropylene (iPP) or syndiotactic polypropylene (sPP), for example, can be described as having the methyl groups attached to the tertiary carbon atoms of successive monomeric units oriented on the same side, or alternating sides for sPP, of a hypothetical plane through the main chain of the polymer.

Desirable morphologic properties may include polymers comprising uniform compact generally spherical particles, having a particular particle size distribution, or a certain bulk density, and low content of fine particles. The generation of undesirable fine particles (i.e., particle diameter less than about 106 microns) can cause plant process difficulties, such as plugging filters, and affect the accuracy of level gauge readings. Alternatively, large particles (i.e., having a low bulk density) are also undesirable because they require more power to circulate though loop reactors, leading to high power consumption and lower production rates.

Additionally, MCSs should ideally have high catalytic activity. One limiting factor in the production of MCSs with high activity is thought to be the low amount of activator or metallocene loaded onto to the support. Another factor limiting catalytic activity is thought to be the low amount of activated metallocene loaded onto the support. Moreover, as the costs for metallocene or activator can be substantial, their efficient use is important to controlling the total cost of producing a MCS.

Accordingly, what is needed in the art is a MCS that provides improved activity, and yet still having acceptable morphological properties, while overcoming the above-mentioned problems.

SUMMARY OF THE INVENTION

To address the above-discussed deficiencies, the present invention provides, in one embodiment, a metallocene catalyst system (MCS) that includes a support and a metallocene bound substantially throughout the support. On exposure to a reaction environment comprising about 300 g to about 400 g propylene per liter of reactor volume, about 23 ppm by weight of said MCS, about 37 ppm by weight $H_2$, and about 46 ppm by weight triethylaluminum in a 4 liter reactor at about 67° C. and about one hour reaction time, the MCS has a catalytic activity of at least about 10,400 g of polypropylene/g of MCS/hr.

Another embodiment is a MCS comprising a catalyst support system including a support having an average pore diameter of greater than about 140 Angstroms and a metallocene bound substantially throughout the support. The MCS has a catalytic activity for a metallocene loading of about 2 wt % that is at least about 20 percent higher than said catalytic activity for said metallocene loading of about 1 wt %.

Another embodiment includes a process for the preparation of a MCS. The process includes providing a support having a surface defining pores and attaching a metallocene substantially throughout the support to form a MCS. The MCS has a catalytic activity for a metallocene loading of about 2 wt % that is at least about 20 percent higher than the catalytic activity for the metallocene loading of about 1 wt %.

In yet another embodiment, the present invention provides a process for producing a polyolefin. The process comprises preparing a metallocene catalyst system (MCS) having a catalytic activity for a metallocene loading of about 2 wt % that is at least about 20 percent higher than the catalytic activity for the metallocene loading of about 1 wt %. The process further includes introducing the MCS into a polymerization reaction chamber and contacting at least one olefin monomer with the MCS in the reaction chamber.

Still another embodiment comprises a polyolefin produced by introducing a metallocene catalyst system (MCS) into a polymerization reaction chamber and contacting at least one olefin monomer with the MCS in the reaction chamber. The MCS has a catalytic activity for a metallocene loading of about 2 wt % that is at least about 20 percent higher than the catalytic activity for the metallocene loading of about 1 wt %.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

As further described below, the present invention discloses a metallocene catalyst system (MCS), a process for preparing the MCS, a process for preparing a polyolefin using the MCS, and the polyolefin produced by that process, improving on that disclosed in U.S. Pat. Nos. 6,143,683, 6,211,109, 6,225,251 and 6,239,058 to Shamshoum et al., and U.S. patent application Ser. Nos. 09/782,752 and 09/782,753 to Gauthier et al., all of which are incorporated herein by reference.

While not limiting its scope, the present invention is founded on the theory that the final catalytic activity and performance of a MCS depends on the support material used in the MCS. In particular, it has been discovered that the catalyst polymerization activity of the MCS is strongly dependent on the pore volume and surface area of the support. In particular, the selection of supports having optimal pore volume and surface area distributions with respect to pore diameter can substantially improve the activity of the MCS.

In certain preferred embodiments, the pore volume and surface area distributions, as a function of pore diameter, are coincident with each other. The terms pore volume and surface area distribution as used herein refer, respectively, to the pore volume and surface area measured for the entire range of pore diameters present in a support. These parameters may be expressed as a total pore volume or total surface area, respectively, for example, as measured by conventional gas absorption/desorption techniques and using the Brunauer, Emmett and Teller model (BET).

More usefully, however, the distributions of pore volumes and surface areas over the range of pore diameters present in the support material, may be measured using conventional methods, such as the Barrett-Joyner-Halenda (BJH) method, and the Oliver-Conklin Density Function Theory (DFT). It is believed that supports, such as silicas, having different pore volume and surface area distribution, may also have different metallocene and activator supporting mechanisms and polymerization behavior. Knowledge about the pore volume and surface area distribution for different silicas thus allows for the selection of an optimal support for producing a MCS.

While not limiting the scope of the present invention by theory, it is believed that MCS activity is facilitated through the selection of supports of sufficiently large pore diameter to allow the metallocene to penetrate and interact with substantially all of the inner surface of the support. At the same time, the pore volume must not be too large so as to decrease the surface area available for activator-metallocene-support interactions, or to create too fragile a MCS, such that it does not remain intact during the process for formation of the MCS or during the MCS's transport to a reactor.

In one embodiment, the present invention is directed to a MCS comprising a support and a metallocene bound substantially throughout the support wherein on exposure to a particular reaction environment the MCS has a catalytic activity of at least about 10,400 g of polypropylene/g of MCS/hr. The reaction environment may comprise about 300 g to about 400 g propylene per Liter of reactor volume, about 23 ppm by weight of the MCS, about 37 ppm by weight $H_2$, and about 46 ppm triethylaluminum in a 4 liter reactor at about 67° C. and about one hour reaction time. In one preferred embodiment, the metallocene, for example, comprises rac dimethylsilanediyl bis(2-methyl-4-phenyl indenyl) zirconium dichloride.

For all catalytic reactions described herein, the use of polymer grade olefin monomers are preferred. Methods of preparing such monomers, and the purity of such monomers are well known to those of ordinary skill in the art. In certain embodiments, the monomer is further purified. For example, when the monomer is propylene, polymer grade propylene having a minimum purity of 99.5 wt % was used after further purification. Specifically, the polymer grade propylene was further purified to remove known catalytic poisons, by sequential passage through columns containing: (1) a Nickel catalyst supported on Alumina for carbonyl sulfide (COS) removal; (2) copper on alumina for $O_2$ removal, (using e.g., BASF R3-11, BASF Corp., Mount Olive, N.J.); (3) molecular sieves for $H_2O$ removal (using e.g., 3A, 4A, 5A or 13X or similar molecular sieves). Columns were activated using means well known to those skilled in the art. Such treatments are expected to reduce COS levels to less than about 20 ppb, and more preferably less than about 5 ppb; reduce $O_2$ levels to less than about 5 ppm, and more preferably less than about 2 ppm; and reduce $H_2O$ levels to less than 5 ppm, and more preferably less than about 2 ppm.

In other preferred embodiments, the MCS has an activity of at least about 11,900, and even more preferably at least about 12,100 of polypropylene/g of MCS/hr (g/g/hr), when the metallocene loading onto the support is about 1 wt % (weight of metallocene per unit weight of support). In other preferred embodiments, the MCS has an activity of at least about 11,800, and more preferably at least about 14,040, and still more preferably at least about 19,000, and even more preferably at least about 23,000 polypropylene/g of MCS/hr, when the metallocene loading is about 2%.

The term metallocene loading as used herein refers to the weight percent of metallocene presented to the support during the preparation of the MCS, and resulting in metallocene bound substantially throughout the support. As further disclosed below, in certain preferred embodiments, the support comprises silica and an activator comprising an alumoxane, for example, MAO, bound substantially throughout the silica support and the metallocene bound to the silica support via the activator.

One skilled in the art would understand that in testing catalytic activity, the amounts of the components in the reaction environment may be varied, so as to provide about 30 to 50% conversion of monomer to polymer. Moreover, one skilled in the art would understand that the desired reaction environment for testing the optimal catalytic activity of different metallocenes may differ from that described above. The polymerization reaction mixture may comprise, for example, different proportions of propylene, MCS, hydrogen and TEAl. For example, the amount of MCS may range from about 10 ppm to about 150 ppm, by weight of the support, and more preferably from 10 ppm to and 100 pmm, with decreased amounts used for higher activity MCSs. The amount of $H_2$ may be varied to provide a polymer having a melt flow between about 2 and about 60 g/10 min, and preferably about 10 g/10 min. $H_2$ may preferably be at least about 5 ppm, and more preferably range between about 28 ppm to about 37 ppm. The amount of TEAl used, typically ranging from about 46 ppm to about 56 ppm, should be sufficient to scavenge inactivators of MCS and provided a polymer having the desired melt flow. Moreover, cocatalysts other than TEAl, such as triisobutylaluminum (TiBAL), may be used.

A second aspect of the present invention is directed to a MCS comprising a catalyst support system including a support material having an average pore diameter of a certain size. The MCS may comprise a catalyst support system including a support having an average pore diameter of greater than about 140 Angstroms and a metallocene bound substantially throughout the support. The MCS has a catalytic activity for a metallocene loading of about 2 wt % that is at least about 20 percent higher than the catalytic activity for the metallocene loading of about 1 wt %. More preferably, with 2 wt % of metallocene loading, the catalytic activity is at least about 55% higher, and more preferably about 85% higher, as compared to 1 wt % loading. In certain preferred embodiments, for example, the MCS has a catalytic activity of at least about 11,800 g/g/hr in a one hour reaction time under the reaction environment previously described herein.

Figure 1:
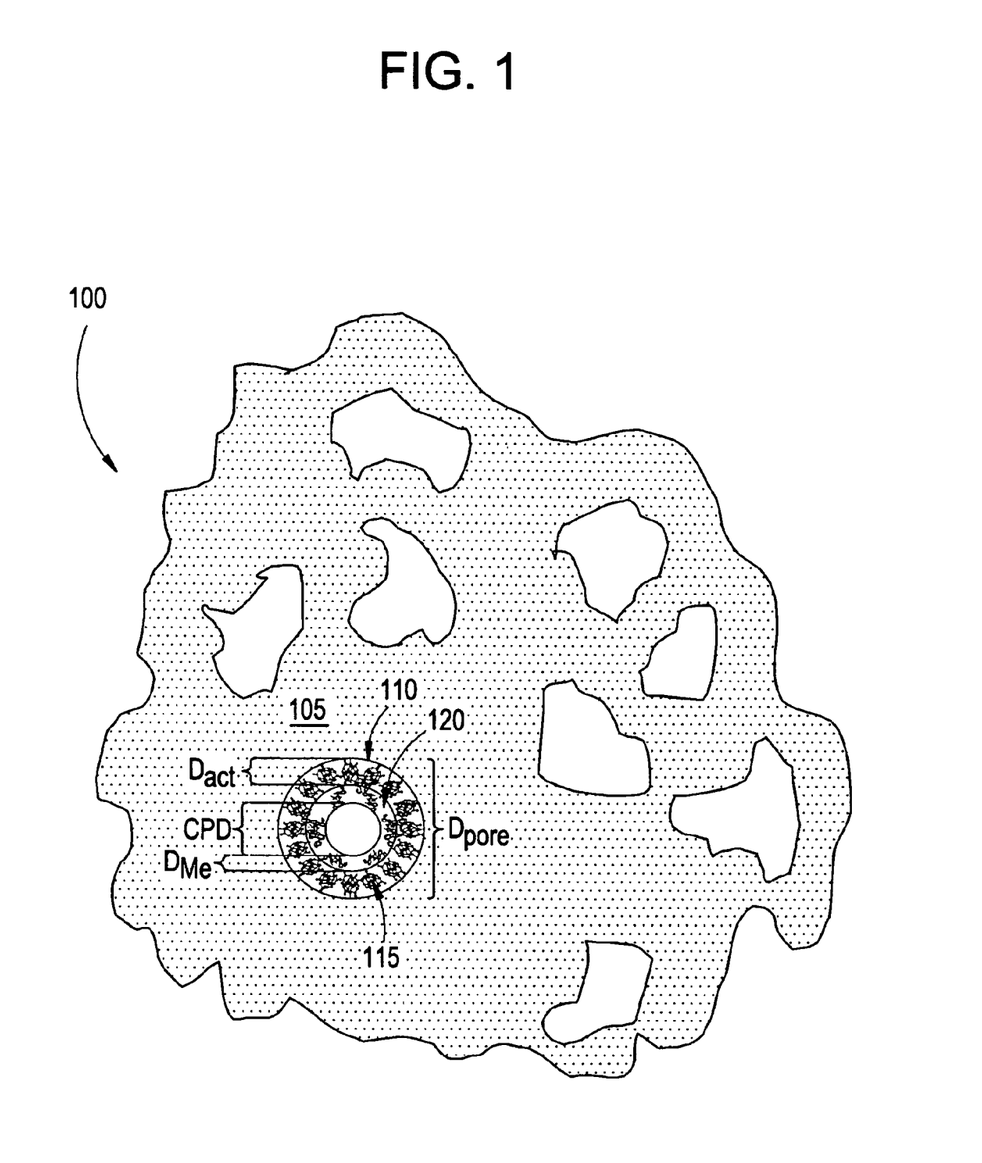
FIG. 1 illustrates a cross section through a portion of a MCS of the present invention.

Illustrated in FIG. 1 is a cross section through a portion of a MCS 100 of the present invention having an idealized, spherical pore 110. In certain embodiments, the MCS 100 comprises a catalyst support system 100, including a silica support 105 having pores 110 with a diameter $D_{pore}$. In certain embodiments, $D_{pore}$ may be greater than about 140 Angstroms, depending on the size of the metallocene and activator bound to the support, as further discussed below. In certain preferred embodiments $D_{pore}$ may range from about 150 Angstroms to about 450 Angstroms, and more preferably about 300 to about 310 Angstroms.

In yet other embodiments, the MCS may further include an optional activator 115, such as an aluminoxane, having a diameter $D_{act}$, and bound to the support 105. In such embodiments, the $D_{act}$ may range from about 1.0 nm to about 5.0 nm, and more preferably the $D_{act}$ has a value of about 1.5 nm. A metallocene 120 having a diameter $D_{Me}$, may be bound to the activator 115 within the pore 110. $D_{Me}$ may range from about 0.5 nm to about 3.0 nm, and in certain preferred embodiments $D_{Me}$ may equal about 1.3 nm. Ideally, after the metallocene complexes with the support, either directly or through an optional activator 115, there remains an open space within the pore 110 defined by a critical pore diameter (CPD).

The $D_{pore}$ is preferably sufficiently large to allow the optional activator 115 to diffuse into and interact with substantially the entire surface area (i.e., both the exterior and interior) of the support 105 and attach thereto. Additionally, the CPD is sufficiently large to allow the metallocene 120 to diffuse throughout and interact with the support 105 and attach thereto, or with the activator 115 bound to the support 105.

Any metallocene may be used in the practice of the invention. As used herein unless otherwise indicated, "metallocene" includes a single metallocene composition or two or more metallocene compositions. Metallocenes are typically bulky ligand transition metal compounds generally represented by the formula:

$$[L]_m M[A]_n \quad (1)$$

where L is a bulky ligand, A is a leaving group, M is a transition metal and m and n are such that the total ligand valency corresponds to the transition metal valency.

The ligands L and A may be bridged to each other, and if two ligands L or A are present, they may be bridged. The metallocene compound may be full-sandwich compounds having two or more ligands L which, for example, may be cyclopentadienyl ligands (Cp) or cyclopentadiene derived ligands or half-sandwich compounds having one ligand L, which is a cyclopentadienyl ligand or cyclopentadienyl derived ligand. Other examples of ligands include fluorenyl (Flu), indenyl (Ind), azulenyl or benzylindenyl groups and their substituted derivatives.

The transition metal atom may be a Group 4, 5, or 6 transition metal and/or a metal from the lanthanide and actinide series. Zirconium, titanium, and hafnium are desirable. Other ligands may be bonded to the transition metal, such as a leaving group, such as, but not limited to, halogens, hydrocarbyl, hydrogen or any other univalent anionic ligand. A bridged metallocene may, for example, be described by the general formula:

$$RCp(R')Cp'(R'')MeQ_n \quad (2)$$

Me denotes a transition metal element and Cp and Cp' each denote a cyclopentadienyl group, each being the same or different and which can be either substituted with R' and R'' groups having from 1 to 20 carbons, respectively, or unsubstituted, the Q groups may be independently selected from an alkyl or other hydrocarbyl or a halogen group, n is a number and may be within the range of 1-3 and R is a structural bridge extending between the cyclopentadienyl rings and comprising a hydrocarbyl radical.

Preferred metallocene-containing catalyst systems that produce isotactic polyolefins are disclosed in U.S. Pat. Nos. 4,794,096 and 4,975,403 which are incorporated by reference herein. These patents disclose chiral, stereorigid metallocenes that polymerize olefins to form isotactic polymers and are especially useful in the polymerization of highly isotactic polypropylene.

Other suitable metallocenes are disclosed in, for example, U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614, 5,374,752; 5,510,502; 4,931,417; 5,532,396; 5,543,373; 6,100,214; 6,228,795; 6,124,230; 6,114,479; 6,117,955; 6,087,291; 6,140,432; 6,245,706; 6,194,341; 6,399,723; 6,380,334; 6,380,331; 6,380,330; 6,380,124; 6,380,123; 6,380,122; 6,380,121; 6,380,120; 6,376,627; 6,376,413; 6,376,412; 6,376,411; 6,376,410; 6,376,409; 6,376,408; 6,376,407; 6,087,29; 5,635,437; 5,554,704; 6,218,558; 6,252,097; 6,255,515 and EP 549 900; EP 576 970; EP 611 773, and WO 97/32906; WO 98/014585; WO 98/22486; and WO 00/12565, each of which is fully incorporated by reference herein in its entirety.

In certain preferred embodiments, the metallocene is one or more of an isospecific stereo rigid metallocene characterized by the formula:

$$R^2 bis(C_5(R^1)_n)MeQ_p \quad (3)$$

wherein each $(C_5(R^1)_n)$ is a substituted cyclopentadienyl ring and n may range from 1 to 20 so long as the number of sites available for substitution are not exceeded. Each $R^1$ is the same or different and is a hydrogen or hydrocarbyl radical having 1-20 carbon atoms. $R^2$ is a structural bridge between the two $(C_5(R^1)_n)$ rings imparting stereorigidity to the metallocene, and imparting a chiral environment to a metal, Me. $R^2$ is selected from the group consisting of an alkylene radical having 1-4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical. The Me is a group 4, 5, or 6 metal as designated in the Periodic Table of Elements. Each Q may be independently selected from a hydrocarbyl radical having 1-20 carbon atoms or is a halogen; and $0 \leq p \leq 3$.

In certain advantageous embodiments, the structural bridge $R^2$, among other things, holds the two $(C_5(R^1)_n)$ rings in a desired chiral orientation to facilitate the production of an isotactic polymer. For example, when the two $(C_5(R^1)_n)$ rings are identical, a racemic orientation is preferred over a meso orientation. In cases where the two $(C_5(R^1)_n)$ rings are non-identical, then the structural bridge $R^2$ holds the ring's orientation to generate the appropriate chirality, for example, to produce isotactic polymer.

In other advantageous embodiments, the $(C_5(R^1)_n)$ groups are indenyl groups which are substituted or unsubstituted. In still other preferred embodiments, the metallocene may be rac dimethylsilanediyl bis(2-methyl-4-phenyl indenyl) zirconium dichloride. In yet other advantageous embodiments metallocene may be selected from the group consisting of rac dimethylsilanediyl bis(2-methyl indenyl) zirconium dichloride, rac dimethylsilanediyl bis(2-methyl-4,5-benzoindenyl) zirconium dichloride and rac dimethylsilanediyl bis(2-methyl-4-(1-naphthyl) indenyl) zirconium dichloride.

The term activator, as used herein, refers to any compound or component, or combination of compounds or components, capable of enhancing the ability of one or more metallocenes to polymerize olefins to polyolefins. In particular embodiments, the activator is any compound capable of generating a catalytically activated cationic center. One particularly useful class of activators are based on organoaluminum compounds, which may take the form of an alumoxane, such as MAO or a modified alkylaluminoxane compound. Alumoxane (also referred to as aluminoxane) is an oligomeric or polymeric aluminum oxy compound containing chains of alternating aluminum and oxygen atoms, whereby the aluminum carries a substituent, preferably an alkyl group. The exact structure of aluminoxane is not known, but is generally believed to be represented by a caged or clustered compound, comprised of components having the following general formula: —(Al(R)—O—)$_{-m}$, for cyclic alumoxane components, and $R_2Al$—O—(Al(R)—O)$_m$—AlR$_2$ for linear alumoxane components, wherein R independently in each occurrence is a $C_1$-$C_8$ hydrocarbyl, preferably alkyl, more preferably $C_1$, or halide, and m is preferably an integer ranging from about 1 to about 40, and more preferably about 4 to about 30, and even more preferably about 10 to about 20.

Alumoxanes are typically the reaction products of water and an aluminum alkyl, which in addition to an alkyl group may contain halide or alkoxide groups. Reacting several different aluminum alkyl compounds, for example, trimethylaluminum (TMA) and tri-isobutyl aluminum, with a correct stoichiometry of water yields so-called modified or mixed alumoxane activators. Other non-hydrolytic routes for the production of activators are well known to those of ordinary skill in the art. Preferred alumoxanes are MAO and MAO modified with minor amounts of other higher alkyl groups such as isobutyl. Alumoxanes generally contain minor to substantial amounts of starting aluminum alkyl compound(s). Other activators include trialkylaluminum, such as TEAl or triisobutylaluminum (TIBAL) or mixtures thereof. Alumoxane solutions, particularly MAO solutions, may be obtained from commercial vendors as solutions having various concentrations (e.g., Albermarle Corp., Baton Rouge, La.; Akzo Nobel Catalysts Ltd., Houston, Tex.; Crompton Corp., Greenwich, Conn.).

There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP 0 279 586, EP-A-0 594 218 and WO 94/10180, each fully incorporated herein by reference. As used herein, unless otherwise stated, "solution" refers to any mixture including suspensions.

Ionizing activators may also be used to activate metallocenes. These activators are neutral or ionic, or organoboron compounds, such as tri(n-butyl)ammonium tetrakis (pentaflurophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations, see e.g., WO 94/07928, incorporated herein by reference.

Descriptions of ionic catalysts for coordination polymerization comprised of metallocene cations activated by non-coordinating anions appear in EP-A-0 277 003, EP-A-0 277 004 and U.S. Pat. No. 5,198,401 and WO-A-92/00333 (incorporated herein by reference). These teach a method of preparation wherein metallocenes, such as bisCp and monoCp, are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorinated aryl-constituents such as phenyl, biphenyl and naphthyl.

The term noncoordinating anion (NCA) as used herein refers to an anion that either does not coordinate to the cation or that is only weakly coordinated to the cation, thereby remaining sufficiently labile to be displaced by a neutral Lewis base, and allows for monomer coordination and insertion. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion.

The use of ionizing ionic compounds not containing an active proton but capable of producing both the active metallocene cation and a noncoordinating anion are also known. See e.g., EP-A-0 426 637 and EP-A-0 573 403, both incorporated herein by reference. An additional method of making the ionic catalysts uses ionizing anion precursors which are initially neutral Lewis acids but form the cation and anion upon ionizing reaction with the metallocene compounds, for example, the use of tris(pentafluorophenyl) borane, see e.g., EP-A-0 520 732, incorporated herein by reference. Ionic catalysts for addition polymerization can also be prepared by oxidation of the metal centers of transition metal compounds by anion precursors containing metallic oxidizing groups along with the anion groups, see e.g., EP-A-0 495 375, incorporated herein by reference.

Where the metal ligands include halogen moieties, for example, bis-cyclopentadienyl zirconium dichloride, that are not capable of ionizing abstraction under standard conditions, they can be converted via known alkylation reactions with organometallic compounds, such as lithium or aluminum hydrides or alkyls, alkylalumoxanes, Grignard reagents, and other reaction well know to those skilled in the art. See EP-A-O 500 944 and EP-A1-0 570 982, both incorporated herein by reference, for in situ processes describing the reaction of alkyl aluminum compounds with dihalo-substituted metallocene compounds prior to or with the addition of activating anionic compounds.

Methods for supporting ionic catalysts comprising metallocene cations and NCA are described in U.S. Pat. Nos. 5,643,847, 6,143,686 and 6,228,795, all incorporated herein by reference. When using the support composition, these NCA support methods generally comprise using neutral anion precursors that are sufficiently strong Lewis acids to react with the hydroxyl reactive functionalities present on the silica surface such that the Lewis acid becomes covalently bound.

Additionally, when the activator for the metallocene supported catalyst composition is a NCA, the NCA is preferably first added to the support composition followed by the addition of the metallocene. When the activator is MAO, the MAO is preferably contacted with the support, and then the metallocene is contacted to the supported MAO. Alternatively, the MAO and metallocene may be dissolved together in solution and then the support is contacted with the MAO/metallocene solution. Other methods and order of addition will be apparent to those of ordinary skill in the art, and as further described below.

Various types of metallocenes are known in the art which may be supported. The supports may include talc, inorganic oxides, clay minerals, ion-exchanged layered compounds, diatomaceous earth, silicates, zeolites or a resinous support material such as a polyolefin or mixtures therefrom. Specific inorganic oxides include clay, silica and alumina, used alone or in combination with other inorganic oxides such as magnesia, titania, zirconia and the like. Non-metallocene transition metal compounds, such as titanium tetrachloride, may also be incorporated into the supported catalyst component.

In certain embodiments when the support comprises an inorganic oxide, the support may be substantially granular. In certain preferred embodiments, the inorganic oxide support is substantially spheroidal. In such embodiments, the support may have an average particle size diameter ranging from about 1 to about 100 microns, and more preferably about 10 to about 60 microns.

In certain preferred embodiments, the support has an average particle size ranging from about 10 to about 33 microns, and more preferably from about 10 to about 20 microns. Such preferred embodiments may be conducive to the production of smaller sized polymer fluffs having average diameters of less than about 600 microns yet still having a desirably high bulk density, for example, at least about 0.40 g/cc, and more preferably at least about 0.44 g/cc.

In certain alternative preferred embodiments, the support has an average particle size ranging from about 20 to about 80 microns, and more preferably from about 25 to about 60 microns. For a MCS of a given activity, such preferred embodiments may be conducive to the production of larger sized polymer fluffs having average diameters of greater than about 600 microns, and yet still having the above-mentioned desirably high bulk density.

A third aspect of the present invention is directed to a process for the preparation of a MCS. The process comprises providing a support having a surface defining pores. The process further comprises attaching a metallocene substantially throughout the support to form a MCS having a catalytic activity for a metallocene loading of about 2 wt % that is at least about 20 percent higher than the catalytic activity for the metallocene loading of about 1 wt %. In certain preferred embodiments, for example, the process results in a MCS having a catalytic activity of at least about 11,800 g/g/hr in a one hour reaction time under the reaction environment previously described herein. In other preferred embodiments, the support comprises granular or substantially spheroidal materials, such as silica. In yet other preferred embodiments, an activator, such as MAO, may be conventionally attached to the pores substantially throughout the support material to form a catalyst support to which the metallocene attaches.

In other embodiments, the pores in the support provides a peak pore volume of greater than about 0.115 mL/g at a pore diameter of greater than about 240 Angstroms. Preferably, however, at the peak pore volume, the pore diameter ranges between about 250 Angstroms and about 350 Angstroms. More preferably, the spheroidal supports have a peak pore volume of greater than about 0.125 mL/g at a pore diameter between about 290 Angstroms and about 320 Angstroms. Even more preferably, the peak pore volume is greater than about 0.13 mL/g at a pore diameter of about 300 to about 310 Angstroms. In other advantageous embodiments, the pore volume is distributed over a narrow range. For example, the support's pore diameter may be between about 230 Angstroms and about 410 Angstroms, at one-half of the peak pore volume.

In still other embodiments, the pores in the support provide a peak surface area of at least about 14.3 $m^2/g$ at a pore diameter between about 250 Angstroms and about 330 Angstroms, and preferably, between about 260 Angstroms and about 320 Angstroms. Even more preferably, the support may have a peak surface area of at least about 17 $m^2/g$ in the above-cited range of pore diameters.

Although pore volume and surface area distributions are the preferred measures for the purpose of selecting and providing optimal supports, alternative selection criteria may be used. For example, in certain embodiments, the support further may have a total pore volume of greater than about 1.68 mL/g and an average pore diameter between about 242 Angstroms and about 253 Angstroms. In an alternative embodiment, however, the total pore volume may be less than about 1.79 mL/g for a support having the above-cited range of average pore diameters. In still other embodiments, the total surface area is greater than about 272 $m^2/g$ for a support having the above-cited range of average pore diameters.

A fourth aspect of the present invention is directed to a process for the polymerization of polyolefin. The process includes preparing a metallocene catalyst system (MCS) having a catalytic activity for a metallocene loading of about 2 wt % that is at least about 20 percent higher than the catalytic activity for the metallocene loading of about 1 wt %. Preparing the MCS includes the selection of supports based on considerations of the critical pore diameter, and the pore volume and surface area distribution of candidate supports as described elsewhere herein. The process also includes introducing the MCS into a conventional polymerization reaction chamber. The process further includes contacting at least one olefinic monomer with the MCS in the reaction chamber under conventional conditions.

In certain preferred embodiments, for example, the process results in a MCS having a catalytic activity of at least about 11,800 g/g/hr in a one hour reaction time under the reaction environment previously described herein. In other preferred embodiments, any alpha olefins, comprising ethylenically unsaturated hydrocarbons having between 2 and 20 Carbon atoms, may be used as the monomer. In yet other preferred embodiments, the process for polymerization may include, for example, an olefinic monomer comprising propylene contacted with the MCS to produce a homopolymer. Preferred reaction conditions may include a reaction temperature between about 50 to about 75° C., and preferably 67° C., a reaction period between about 15 minutes and 120 minutes, and include hydrogen gas and TEAl in the reaction chamber, in amount described elsewhere herein. Other embodiments may further comprise, for example rac dimethylsilanediyl bis(2-methyl-4-phenyl indenyl) zirconium dichloride, having up to about 2 wt % of the metallocene loaded onto the support, and an alumoxane activator comprising methylaluminoxane.

In yet other embodiments, the above-described process may be used to produce a polyolefin comprising a copolymer under reaction conditions previously described herein. Any combination of alpha olefins, comprising ethylenically unsaturated hydrocarbons having between 2 and 20 Carbon atoms, may be used as the monomer. For example, one preferred monomer mixture comprises propylene and ethylene. Other preferred monomer mixtures may include propylene, butene and ethylene, or propylene and butene.

A fifth aspect of the present invention is directed to a polyolefin produced by any of the above-described processes. The process comprises introducing a MCS into a polymerization reaction chamber. The MCS has a catalytic activity for a metallocene loading of about 2 wt % that is at least about 20 percent higher than the catalytic activity for the metallocene loading of about 1 wt %. The process further comprises contacting at least one olefin monomer with the MCS in the reaction chamber.

In certain preferred embodiments, the polyolefin is produced by a MCS having a catalytic activity of at least about 11,800 g/g/hr in a one hour reaction time under the reaction environment previously described herein. In other preferred embodiments, the polyolefins may be converted to resins used in the manufacture a variety of end products such as films, fibers, injection molded articles and other materials well known to one of ordinary skill in the art. In other advantageous embodiments, the metallocene may comprise rac dimethylsilanediyl bis(2-methyl-4-phenyl indenyl) zirconium dichloride and an alumoxane activator comprises methylaluminoxane.

In yet other preferred embodiments, the polyolefin produced, for example isotactic polypropylene, has an average particle size diameter of greater than about 200 microns. Certain preferred embodiments may include polymer fluffs having a certain particle size. For example, the average polymer fluff diameter may be between about 400 microns and about 2000 microns, and preferably between about 600 and about 1500 microns. Such particle sizes may be more advantageously produced in certain plant-scale reactor facilities, such as loop type reactors, and post-reactor processing facilities that are designed to handle such sized polymer fluffs.

In yet other preferred embodiments, the production of different sized polymer fluffs may be advantageous. For example, the average polymer fluff diameter may be between about 500 microns and about 1500 microns, and more preferably between about 600 and about 1200 microns. Such particle sizes may be more advantageous in certain plant-scale production facilities having reactors, such as Spheripol™ type reactors, and post-reactor processing, such as the devolitization and transport, designed to handle such sized polymer fluffs.

In still other embodiments, the polyolefin produced, for example isotactic polypropylene, may have a bulk density of at least about 0.37 and more preferably at least about 0.40 g/cc, and even more preferably at least about 0.44 g/cc.

Having described the present invention, it is believed that the same will become even more apparent by reference to the following experiments. It will be appreciated that the experiments are presented solely for the purpose of illustration and should not be construed as limiting the invention. For example, although the experiments described below may be carried out in laboratory or pilot plant settings, one skilled in the art could adjust specific numbers, dimensions and quantities up to appropriate values for a full scale plant.

EXPERIMENTS

Four experiments were conducted to compare: (1) the pore characteristics of several silica supports; (2) the loading of activator onto the supports; (3) the catalytic activity of MCSs prepared using the supports; and (4) the properties of polymers produced from polymerization reactions catalyzed by the above-prepared MCSs.

Experiment 1

Six silica supports were selected for comparison: (1) product number Cariact P-10, from Fuji Silysia Chemical Company, Ltd. (Japan); (2) product number Sylopol 948 ("G-948"), (3) product number Sylopol 952-1836 ("G-952"), and (4) product number XPO-2412, all from Grace Davison Chemicals (Columbia, Md.); (5) product number ES747JR, from INEOS Silicas Ltd. (England); and (6) product number Sunsphere H202, from Asahi Glass Co. Ltd. (Japan). The average particle size of the silicas was determined using a conventional Malvern sizer and methodology in hexane or acetone. The analysis of the pore characteristics (i.e., pore volume, surface area, pore diameter and distributions) was conducted on an ASAP 2400 (Micromeritics Instrument Corp., Norcross, Ga.), using nitrogen as the adsorbate for the conventional measurements of adsorption and desorption isotherms. The data was used for the calculation, using the BET model, of total surface area, total pore volume and average pore diameter. In addition, the data were analyzed to determine, using the BJH method and DFT, the pore volume and surface area distributions.

TABLE 1 summarizes the total surface area, total pore volume and average pore diameter for the six silicas. Typical standard deviations are ±5% for determination of surface area, pore volume and pore diameter, and ±10% for the determination of particle size, using hexane. All six silicas had total surface areas of at least about 260 $m^2/g$ and high pore volume of at least about 1.4 mL/g. The average support particle size ranged from about 20 to about 33 microns, except for G-948 at about 55 microns.

TABLE 1

| Support | Surface Area ($m^2/g$) | Pore Volume (mL/g) | Average Pore Diameter (Å) | Avg. Particle Size (μm) |
|---|---|---|---|---|
| P10 | ~270 | ~1.5 | ~222 | ~20 |
| G-952 | ~278 | ~1.68 | ~242 | ~33 |
| G-948 | ~272 | ~1.71 | ~253 | ~55 |
| ES747JR | ~263 | ~1.60 | ~244 | ~20 |
| XPO-2412 | ~474 | ~1.53 | ~129 | ~21 |
| H202 | ~678 | ~1.53 | ~90 | ~23 |

The pore volume and surface area distributions for the silicas were also measured. The BJH method was used for calculating these distributions, based on a model of the adsorbent (i.e., the silica carrier) as a collection of cylindrical pores. The calculation accounts for capillary condensation in the pores using the classical Kelvin equation (free energy of surface tension), which in turn assumes a hemispherical liquid-vapor meniscus and a well-defined surface tension. The calculation also incorporates thinning of the adsorbed layer through the use of a reference isotherm, so that the Kelvin equation is only applied to the "core" fluid.

In addition, the DFT was used to make distribution calculations using conventional mathematical, statistical, and numerical techniques for interpreting data from the ASAP 2400 instruments. The DFT offers a unified approach to analyzing the entire adsorption isotherm from about 4 to about 1000 Å in diameter. All pores, from the smallest to the largest, are reported using a single data reduction technique, termed as the BJH-DFT reduction, thereby providing a broad picture of adsorption activity.

Figure 2:
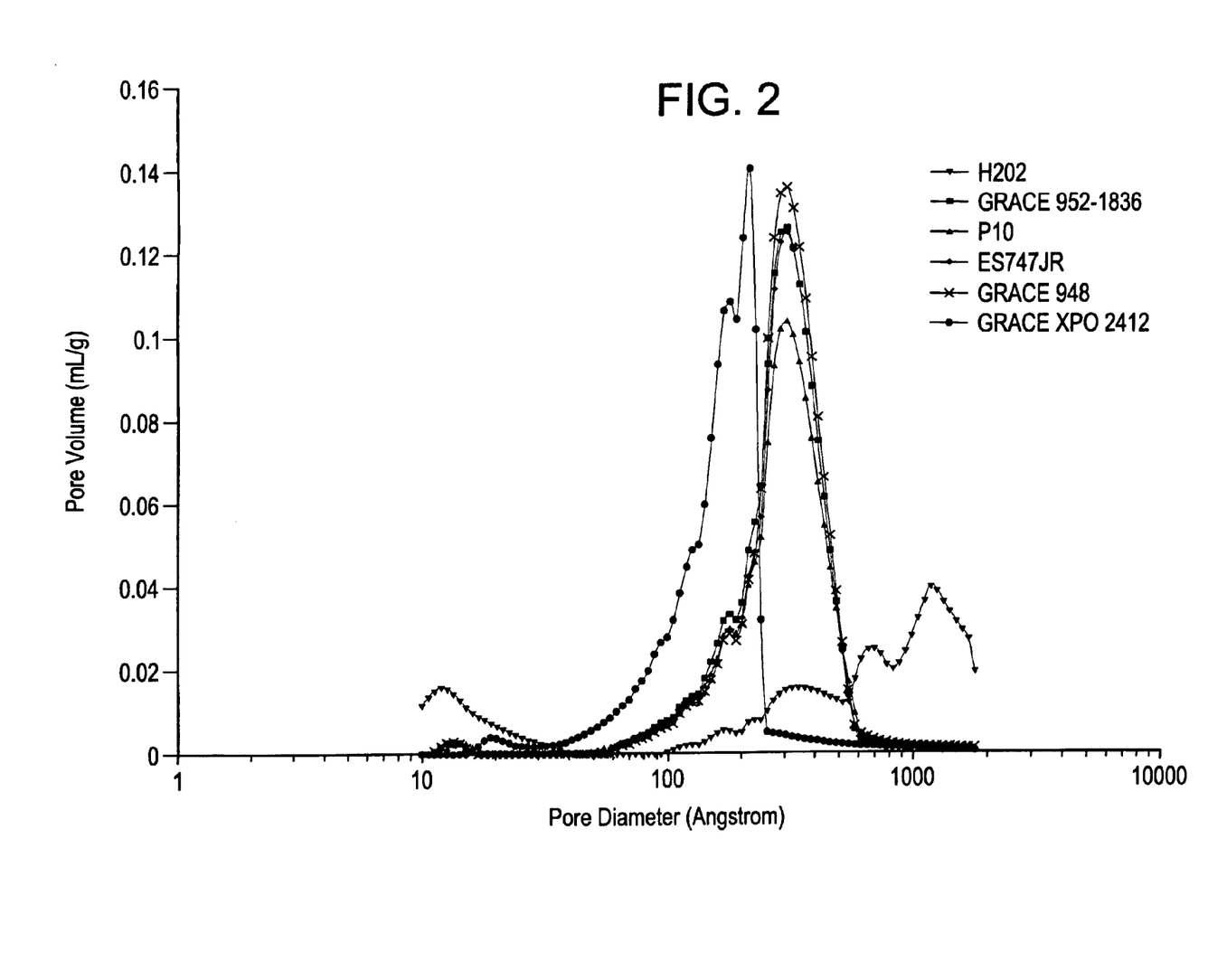
FIG. 2 illustrates BJH-DFT analysis results of pore volume distribution with respect to pore diameter for different silicas.

FIG. 2 illustrates BJH-DFT analysis results of pore volume distribution with respect to pore diameter for the different silicas. FIG. 2 reveals that, even though XPO-2412 and H202 have high total pore volumes (TABLE 1), most of the pores had diameters of less than about 150 Å. As such, these silicas are unlikely to provide substantial numbers of pores having a CPD in a range suitable for most metallocenes. In addition, it is thought that silicas having a substantial number of pores with a pore diameter larger than about 400 Å, may not be suitable because some of the pore space may be incompletely filled, thus inefficiently used as a support. Silicas, such as G-948, G-952, ES747JR and P10, have the bulk of their pore volumes distributed between 150 and 400 Å. Among these four silicas, G-948 had the highest amount of pore volume distributed between 150 and 400 Å, and P10 the lowest.

Figure 3:
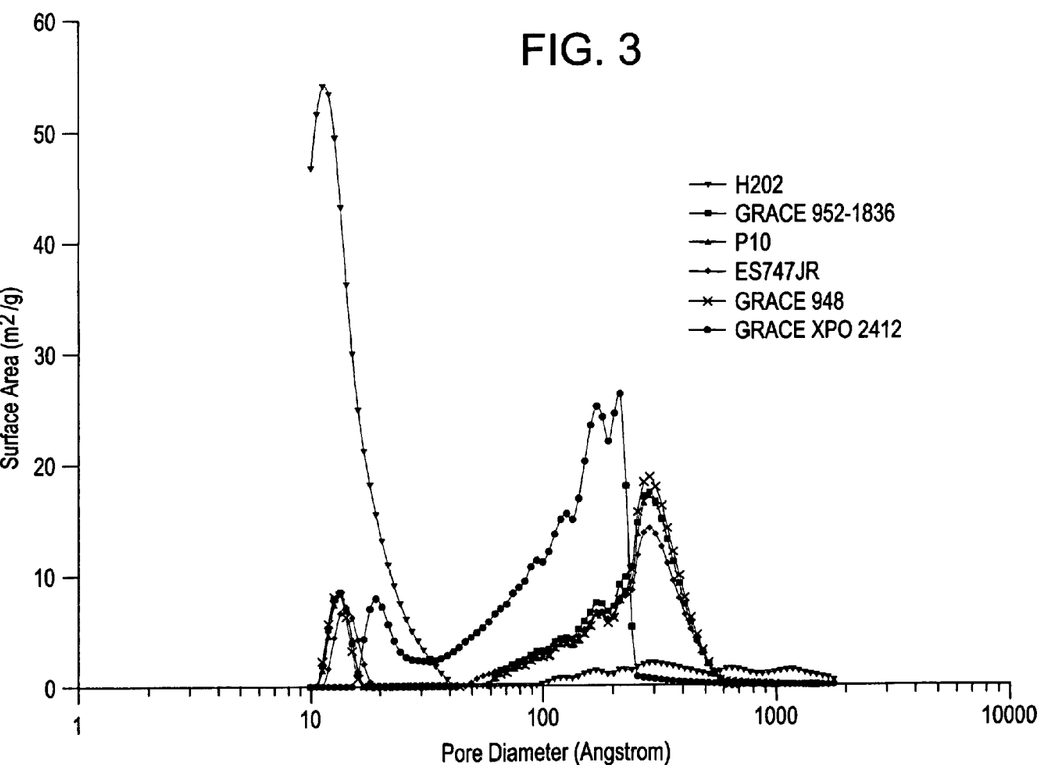
FIG. 3 illustrates BJH-DFT analysis results of surface area distribution with respect to pore diameter for different silicas.

FIG. 3 illustrates BJH-DFT analysis results of surface area distribution with respect to pore diameter for the different silicas. Again, although H202 and XPO-2412 have high total surface areas (TABLE 1), most of the surface area, is allotted to small pores with diameters of less about 150 Å. For example, most of the surface area for H202 is accounted by small pores, having diameters of less than about 40 Å. Taking the results from FIGS. 3 and 4 together, for XPO-2412 and H202, most of the pores with the small pore diameters account for the main surface area but little of the pore volume. For the G-948, G-952, ES747JR and P10 silicas, the main pore volume is distributed between 140 and 400 Å. Moreover, comparison of FIGS. 3 and 4 reveal that both the pore volume and surface area have the same distribution trends versus pore diameter for these four silica carriers. Again, among these four, G-948 had the highest amount of surface area distributed between 150 and 400 Å, and P10 the lowest.

Experiment 2

The loading of activator into the six silica supports was also examined. The reaction between silicas and MAO (Albermarle Corp., Baton Rouge, La.) was conducted substantially as described in U.S. patent application Ser. Nos. 09/782,752 and 09/782,753 to Gauthier et al, incorporated by reference. Briefly, unless otherwise indicated, all the silica supports were dried at 150° C. for 12 hours under nitrogen flow of 6 mL/min. Two processes were used, as described in the above-cited applications: room temperature grafting (Process 1) and grafting at 115° C. (Process 2). For Process 1, room temperature grafting in toluene was carried out with the starting concentration ratio of MAO:silica equal to about 0.70:1.00, except for XPO-2412 and H202, where the ratio was about 1:1. Process 2, involved grafting at 115° C. in toluene for 4 hours, with the starting concentration ratio of MAO:silica equaled about 1.0:1.0 MAO:silica for all silicas, except H202 whose ratio was 1.35:1. Following grafting, both Process 1 and 2 work-ups included filtration and several toluene washes to remove excess Al species.

The extent of MAO grafting achieved for the six silicas was assessed by measuring Maximium Grafting Yield (MGY), defined by the formula:

$$MGY = ((W_2 - W_1)/W_1) \times 100\% \quad (3)$$

where $W_2$ is defined as the weight of the MAO-modified silica support, and $W_1$ is the weight of the support before grafting. The standard deviation in MGY values is estimated to be about ±0.2 wt %. The result of these measurements are shown in TABLE 2.

For all six silicas, Process 2 resulted in a higher loading of MAO onto the silica support than Process 1. Using Process 1, P10 had the lowest MGY at room temperature, with G-948 and G-952 having about 20% greater yields. The MGY for ES747JR, G-948, and G-952, were all less than about 6.4% higher for Process 1 compared to Process 2.

TABLE 2

| | MGY (wt %) | |
|---|---|---|
| Support | Process 1 | Process 2 |
| P10 | ~44.0 | ~62.5 |
| ES747JR | ~52.8 | ~57.2 |
| G-948 | ~57.1 | ~61.1 |
| G-952 | ~59.2 | ~65.6 |
| XPO-2412 | ~72.5 | ~83.6 |
| H202 | ~100.0 | ~135.0 |

Figure 4:
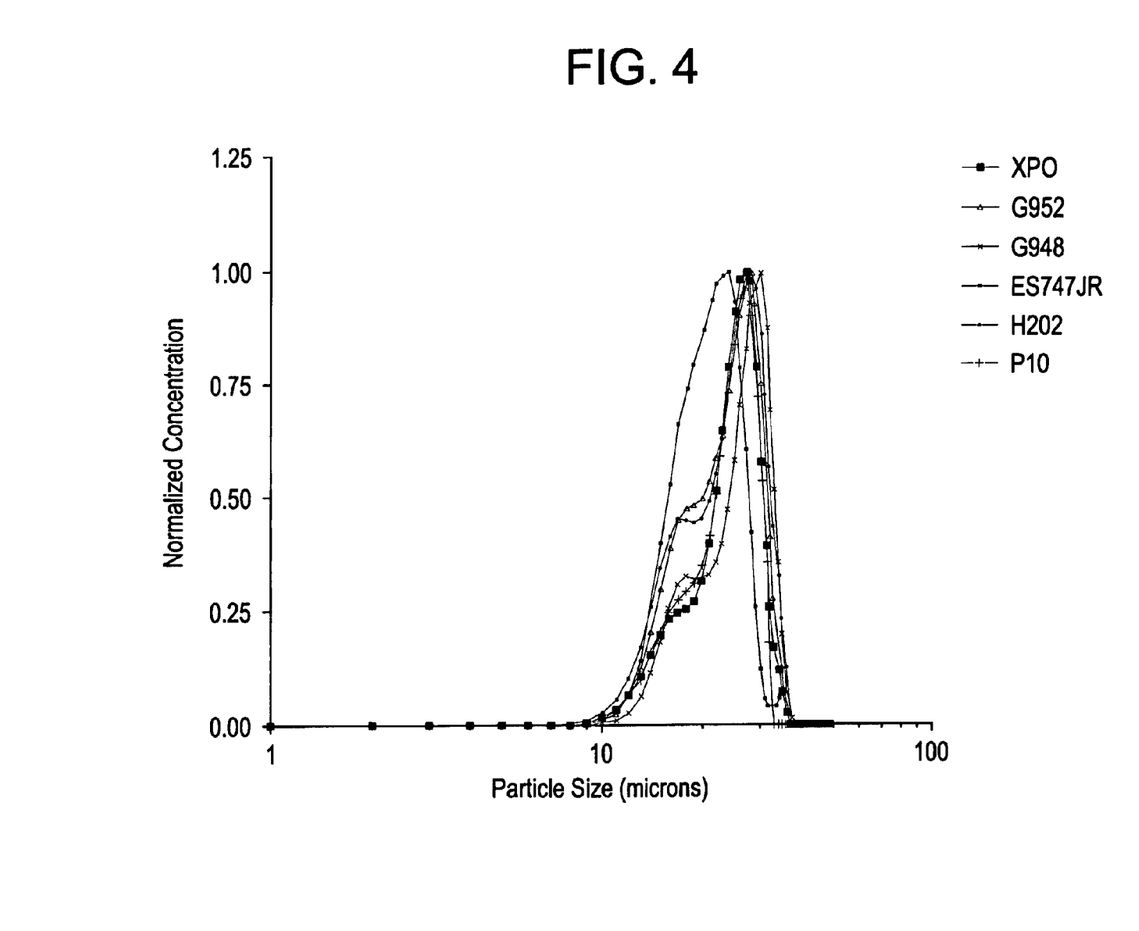
FIG. 4 illustrates a particle size distribution analysis of the MAO-modified silica supports.

A particle size distribution analysis of the MAO-modified silica supports was performed using the above-mentioned Malvern Sizer. The analysis, illustrated in FIG. 4, reveals that all the MAO-modified supports contain a small shoulder peak having an average particle size of less than about 20 μm, which has been tentatively assigned to MAO gels. FIG. 4 reveals that ES747JR had a relatively larger MAO gel content than the other five silicas.

Experiment 3

In another series of experiments, the catalytic activity of MCSs prepared using the above-described silica supports was measured. An additional support, product number MS-1733 from PQ Corp. (Valley Forge, Pa.), was also tested. The total surface area (~311 m²/g), pore volume (~1.79 mL/g) and average particle size (~74 μm) of the MS-1733 support was determined using the same methodology as described above.

The metallocene, rac dimethylsilanediyl bis(2-methyl-4-phenyl indenyl) zirconium dichloride, was loaded in the MAO-modified silicas that were prepared similar to that described above for Experiment 2. To prepare the MCS, about 2.5 g of MAO-modified silica was mixed with 25 mLs of toluene at room temperature under nitrogen. The metallocene (about 25 mg; designated as 2% metallocene loading) in about 10 mL of toluene was added to MAO-modified silica under stirring. The mixture was allowed to react for about 2 hours at room temperature (about 22° C.). The MCS was then filtered and washed three times with toluene (3×10 mL) and three times with hexane (3×10 mL) under nitrogen at room temperature. After an optional drying step at room temperature under vacuum to a constant weight, the resulting MCS was diluted into about 25 g of mineral oil and then isolated as a solid slurry. The process for preparing the MCS with a lower amount of metallocene loading (designated as 1% metallocene loading) was carried out similar to that described above except that a correspondingly lower ratio of metallocene to MAO-modified silica was used.

The catalytic activity (CA) of the MCS was measured using the methodology substantially similar to that described in U.S. patent application Ser. Nos. 09/782,752 and 09/782,753 to Gauthier et al. Specifically, polymerization was carried out in a conventional 2 or 4 Liter reaction chamber, in the presence of about 28 ppm $H_2$ (2 L reactor) or 37 ppm (4 L reactor), about 28 ppm (2 L reactor) or about 23 ppm (4 L reactor) of MCS, about 56 ppm (2 L reactor) or about 46 ppm (4 L reactor) of TEAL, at about 67° C. for about one hour using about 300 to about 400 g propylene per liter of reactor volume. Catalytic activity is thus expressed as g of polypropylene produced per g of MCS per 1 hr (g/g/hr). For all experiments, polymer grade propylene (minimum purity 99.5 wt %) was used after further purification steps, described elsewhere herein, to reduce levels of COS, $O_2$, and $H_2O$.

The catalytic activity for MCSs prepared from the seven different MAO-modified silica carriers prepared at room temperature (Process 1) and 1 wt % metallocene loading, and high temperature (Process 2) and 1 or 2 wt % metallocene loading are illustrated in TABLE 3.

TABLE 3

| | Silica Support | | | | | |
|---|---|---|---|---|---|---|
| | Process 1 (1 wt % loading) | | Process 2 (1 wt % loading) | | Process 2 (2 wt % loading) | |
| | MAO:Si (wt:wt) | CA (g/g/hr) | MAO:Si (wt:wt) | CA (g/g/hr) | MAO:Si (wt:wt) | CA (g/g/hr) |
| P10 | 0.44:1 | ~3400 | 0.62:1 | ~10300 | 0.62:1 | ~11700 |
| G-948 | 0.57:1 | ~5400 | 0.61:1 | ~12100 | 0.61:1 | ~18800 |
| G-952 | 0.59:1 | ~6500 | 0.69:1 | ~11900 | 0.69:1 | ~22200 |
| ES747JR | 0.53:1 | ~4100 | 0.57:1 | ~8500 | | |
| XPO-2412 | 0.72:1 | ~5500 | 0.84:1 | ~9700 | | |
| H202 | | | 1.0:1 | ~6600 | | |
| MS-1733 | | | | | 0.76:1 | ~23,500 |

For supports prepared with similar starting ratios of MAO to silica (MAO:Si), the MCSs produced from either Process 1 or 2, having G-948 and G-952 supports, had the highest catalytic activity. As indicated in TABLE 3, similar MAO:Si ratios were used, except for XPO-2412 and H202, where higher ratios were used. Also, the MCSs produced from Process 2 had higher activity than the MCSs produced from Process 1. It is thought that heating and refluxing facilitates the fixation of MAO on the silica, thus increasing the space available to contribute to the CPD, as compared to MAO fixation done at room temperature. It is thought that the pore volume and pore area distribution of preferred supports, such as G-948, G-952, and MS-1733 allow greater amounts of metallocene to be bound and activated in the interior pores in these supports, as compared to other non-preferred supports, such as P10, thereby resulting in greater catalytic activity.

The beneficial effect of higher amounts of metallocene loading on catalytic activity for certain MCSs having high surface area and pore volume supports is illustrated in TABLE 3. For example, for P10 supported MCSs, the enhancement in catalytic activity per unit weight of MCS was less than about 14% when the metallocene loading was increased to about 2 wt %, compared to the catalytic activity obtained with about 1 wt % metallocene loading. In contrast, the catalytic activity for G-948 supported MCS using a metallocene at 2.0 wt % loading was at least about 20% higher, and in some cases greater than about 55% or greater than about 85% higher, as compared to the catalytic activity at 1.0 wt % loading. In another experiment even higher activity, 22,600 g/g/hr, was obtained when a G-952 supported MCS was loaded with 2.5 wt % metallocene.

Experiment 4

A fourth series of experiments were conducted to characterize the polymers produced from polymerization reactions carried out under conditions similar to that described in Experiment 3. For all of the MCSs, an isotactic polypropylene was produced, having for example, a meso pentad content of at least about 95% and a regioregularity of greater than about 99.0%. Polymer melt flow (MF) was recorded on a Tinius-Olsen Extrusion Plastometer at 230° C. with a 2.16 Kg mass. Polymer powder was stabilized with approximately 1 mg of 2,6-ditert-butyl-4-methylphenol (BHT) to prevent degradation in the MF indexer. Bulk density (BD) measurements were conducted by weighing the unpacked contents of a 100 mL graduated cylinder containing the polymer powder. The polymer fluff particle size distribution was measured using a conventional sieve shaker.

TABLE 4 illustrates the melt flow and bulk density properties of polypropylene produced under the conditions used to produce the MCS described in TABLE 3. The melt flow of the polymers, including polymer produced using G-948 and G-952 supported MCS, was acceptable, having a value of greater than about 0.1 g/10 min. The bulk densities of polymer produced using Process 1 or 2 with G-948 and G-952 supported MCS were also had acceptable values, greater than about 0.35 g/cc, similar to that obtained for polymers produced using MCSs supported by the other silicas.

TABLE 4

| | Process 1 | | Process 2 | |
|---|---|---|---|---|
| Silica Support | MF (g/10 min) | BD (g/cc) | MF (g/10 min) | BD (g/cc) |
| P10 | ~5 | ~0.42 | ~2 | ~0.42 |
| G-948 | ~9 | ~0.37 | ~1 | ~0.37 |
| G-952 | ~3 | ~0.38 | ~0.8 | ~0.41 |
| ES747JR | ~11 | ~0.36 | ~0.4 | ~0.40 |
| XPO-2412 | ~8 | ~0.38 | ~2 | ~0.40 |
| H202 | | | ~3 | ~0.44 |

Figure 5:
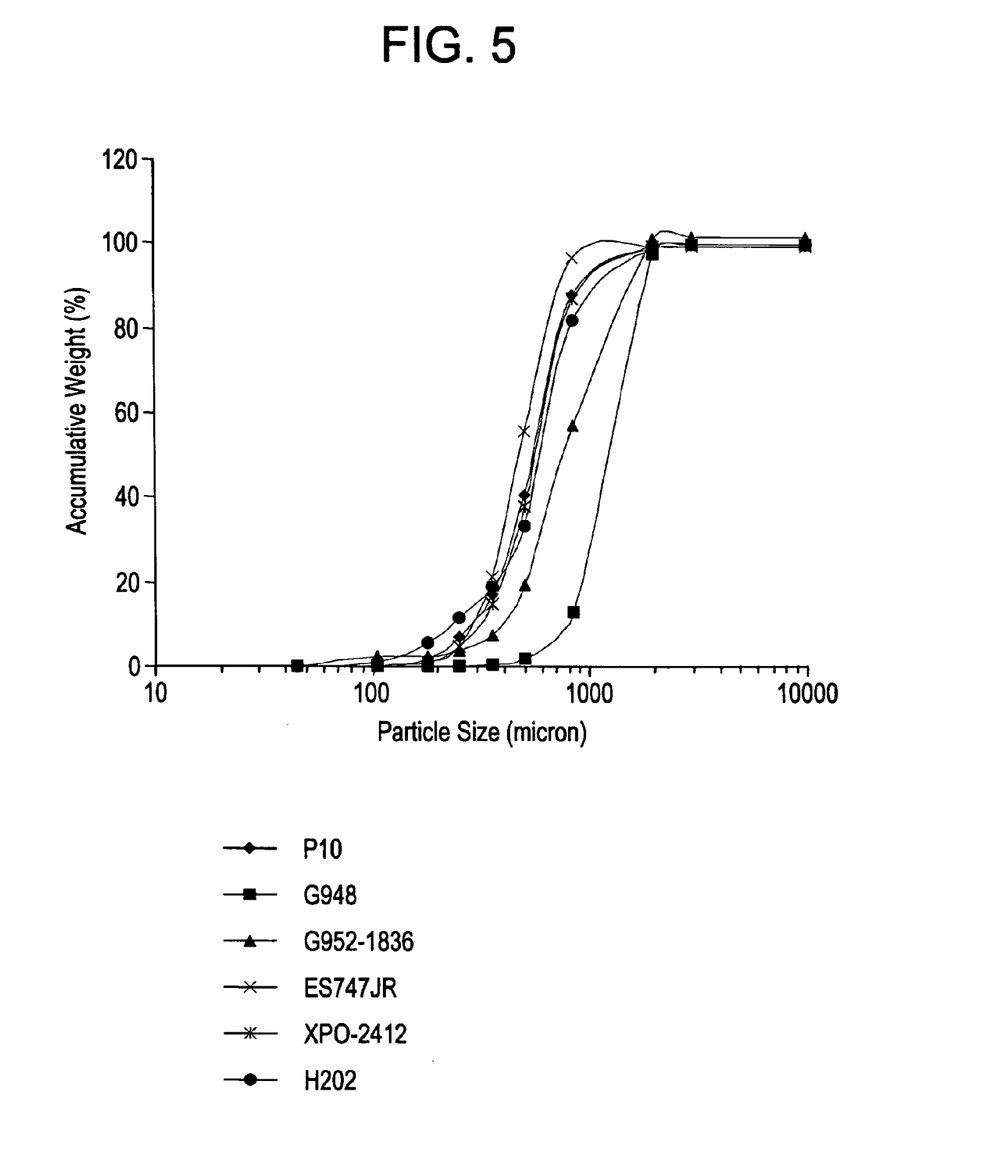
FIG. 5 illustrates a particle size distribution of polymer produced using different silica supported MCS.

The particle size distribution of polymer produced using Process 2 and six of the silica supported MCS is shown in FIG. 5. Of these, polymer produced using G-948 supported MCS had the largest particle size. The polypropylene produced using G-948 and G-952 supported MCS both had a median particle size (an accumulative wt % equal to about 50%) of greater than about 600 microns.

Although the present invention has been described in detail, those skilled in the art should understand that they can make various changes, substitutions and alterations herein without departing from the scope of the invention.

What is claimed is:

1. A process for the polymerization of olefin to produce polyolefin comprising:
    introducing a metallocene catalyst system (MCS) into a polymerization reaction chamber, wherein the MCS comprises:
        a support, wherein the support has an average pore diameter of from 240 Angstroms to 350 Angstroms;
        an activator comprising an aluminoxane; and
        a metallocene bound substantially throughout the support, wherein the metallocene loading is about 1% to about 2%, and wherein the metallocene is selected from a group consisting of rac-dimethylsilanediyl bis(2-methyl-4-phenylindenyl)zirconium dichloride; rac-dimethylsilanediyl bis(2-methyl indenyl)zirconium dichloride; rac-dimethylsilanediyl bis(2-methyl-4,5-benzoindenyl)zirconium dichloride; and rac-dimethylsilanediyl bis(2-methyl-4-(1-naphthyl)indenyl)zirconium dichloride; and
        wherein on exposure to a reaction environment comprising about 300 g to about 400 g propylene per Liter of reactor volume, about 23 ppm by weight of the MCS, about 37 ppm by weight $H_2$, and about 46 ppm triethylaluminum in a 4 liter reactor at about 67° C. and about one hour reaction time, the MCS has a catalytic activity of at least about 11,800 g of polypropylene/g of MCS/hr; and
    contacting at least one olefin monomer with the MCS in the polymerization reaction chamber.

2. The process of claim 1, wherein the metallocene comprises rac-dimethylsilanediyl bis(2-methyl-4-phenylindenyl)zirconium dichloride, and wherein the propylene comprises polymer grade propylene further purified to having COS levels of less than about 20 ppb, $O_2$ levels of less than about 5 ppm and $H_2O$ levels of less than about 5 ppm.

3. The process of claim 1, further comprising preparing the MCS prior to introducing the MCS into the polymerization reaction chamber;
    wherein the activator is dissolved in a solvent and added to the support at about the reflux temperature of the solvent; and
    wherein the metallocene is added to the support at approximately room temperature.

4. The process of claim 1, wherein the olefin monomer comprises an alpha olefin comprising ethylenically unsaturated hydrocarbons having between 2 and 20 carbon atoms.

5. The process of claim 1, wherein the olefin monomer is selected from a group consisting of:
    a mixture of propylene and ethylene;
    a mixture of propylene, butene and ethylene; and
    a mixture of propylene and butene.

6. The process of claim 1, wherein the olefin monomer comprises polymer grade propylene further purified to having COS levels of less than about 20 ppb, $O_2$ levels of less than about 5 ppm and $H_2O$ levels of less than about 5 ppm.

7. The process of claim 1, wherein the MCS has a catalytic activity for a metallocene loading of about 2 wt % that is at least about 20 percent higher than the catalytic activity for the metallocene loading of about 1 wt %.

8. The process of claim 1, wherein the support has a total pore volume that is less than about 1.79 mL/g;
    wherein the metallocene is loaded at about 2 wt % on the support; and
    wherein the catalytic activity of the MCS is between 11,800 and 23,000 g of the polypropylene/g of MCS/hr.

9. The process of claim 8, wherein the catalytic activity of the MCS is at least about 14,040 g of the polypropylene/g of MCS/hr.

10. The process of claim 1, wherein the support has an average pore diameter of from 242 Angstroms to 253 Angstroms.

11. The process of claim 10, wherein the support has a total pore volume of greater than about 1.68 mL/g.

12. The process of claim 10, wherein the support has a total surface area of greater than 272 $m^2/g$.

13. The process of claim 1, wherein the support is substantially spheroidal and said pores have a peak pore volume of greater than about 0.115 mL/g at an average pore diameter between about 250 Angstroms and about 350 Angstroms.

14. The process of claim 1, wherein the support is substantially spheroidal and said pores provide a peak surface area of at least about 14.3 $m^2/g$ at an average pore diameter between about 250 Angstroms and about 330 Angstroms.

15. The process of claim 1, wherein the MCS further comprises an ionizing activator.

16. A process for forming a film, fiber, or injection molded article comprising:
    converting the polyolefin formed by the process of claim 1 into a resin; and
    making a film, fiber, or injection molded article using the resin.

* * * * *